United States Patent
Shamshoum et al.

(10) Patent No.: US 6,489,411 B1
(45) Date of Patent: Dec. 3, 2002

(54) CATALYST FORMULATION AND POLYMERIZATION PROCESSES

(75) Inventors: Edwar S. Shamshoum, Houston, TX (US); David J. Rauscher, Webster, TX (US); Shabbir A. Malbari, Pasadena, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/653,607

(22) Filed: Aug. 30, 2000

Related U.S. Application Data (63) Continuation of application No. 08/085,974, filed on Jun. 30, 1993, now abandoned.

(51) Int. Cl.$^7$ ................................................ C08F 4/609
(52) U.S. Cl. .................... 526/119; 526/122; 526/124.9; 526/125.3; 526/128
(58) Field of Search ............................ 526/124.9, 125.3, 526/114, 119, 122, 128

(56) References Cited

U.S. PATENT DOCUMENTS

| | | | | |
|---|---|---|---|---|
| 4,952,649 A | * | 8/1990 | Kioka et al. ................ | 526/125 |
| 4,990,479 A | * | 2/1991 | Ishimaru et al. ............. | 526/125 |
| 5,028,671 A | * | 7/1991 | Kioka et al. ............. | 526/128 X |
| 5,075,396 A | * | 12/1991 | Kashiwa ...................... | 526/125 |
| 5,093,415 A | * | 3/1992 | Brady et al. ......... | 526/125.6 X |
| 5,100,981 A | * | 3/1992 | Schreck et al. ............. | 526/125 |

* cited by examiner

*Primary Examiner*—Fred Teskin
(74) *Attorney, Agent, or Firm*—William D. Jackson (57) ABSTRACT

Processes for the polymerization of olefins with Zeigler-type catalyst systems which involve transition metal catalyst components comprising 4, 5 or 6 transition metals incorporating internal electron donors to provide desired polymerization characteristics, including yield and polymer characteristics. Specific olefins used in the polymerization process are $C_2$–$C_4$ alpha olefins such as propylene in the production of stereoregular polypropylene. The catalyst system comprised a transition metal component having an internal electron donor in an amount providing an internal donor/transition metal mole ratio of no more than 2/3. This is combined with an organoaluminum co-catalyst component to provide a precursor mixture having an aluminum/transition metal mole ration of at least 100. The precursor mixture is combined with an organosilicon external electron donor component in an amount to provide an aluminum/silicon mole ration of no more than 200. The catalyst system is introduced to a polymerization reactor to effect polymerization of the olefin with the catalyst system.

14 Claims, 3 Drawing Sheets

CATALYST FORMULATION AND POLYMERIZATION PROCESSES

This Application is a continuation of prior application Ser. No. 08/085,974 filed Jun. 30, 1993, now abandoned.

FIELD OF THE INVENTION

This invention relates to the polymerization of unsaturated hydrocarbons over Ziegler-type catalyst systems and more particularly to polymerization processes carried out using transition metal catalyst components of such systems having varying internal electron donor-transition metal ratios.

BACKGROUND OF THE INVENTION

The polymerization of unsaturated hydrocarbons over Ziegler-type catalysts is well known in the art. Such hydrocarbons normally take the form of short chain alpha olefins such as ethylene, propylene and butylene, including substituted alpha olefins such as substituted vinyl compounds, for example, vinyl chloride or vinyl toluene. However, such unsaturated hydrocarbons can also include di-olefins such as 1-3-butadiene or 1-4-hexadiene or acetylenically unsaturated compounds such as methylacetylene or 2-butyne.

Ziegler-type catalysts incorporate a transition metal, usually titanium, zirconium or hafnium, although other transition metals found in Groups 4, 5 and 6 of the Periodic Table of Elements may be employed, which function to provide sites for the insertion of monomer units into growing polymer chains. One type of such polymerization catalysts are the so-called homogeneous catalyst systems in which the transition metal compound is a metallocene comprising one or more substituted or unsubstituted cyclopentadienyl groups coordinated with the transition metal atom forming the situs for polymer growth. Such metallocene-based catalyst systems are the subject of European Patent Application EP 129,368 and U.S. Pat. No. 4,794,096 to Ewen and U.S. Pat. No. 4,892,851 to Ewen et al., the latter two patents disclosing catalysts useful in the polymerization of propylene to form isotactic and syndiotactic polypropylene, respectively.

The more widely used transition metal catalysts are the so-called heterogeneous catalyst systems in which a transition metal halide, usually zirconium, hafnium or titanium, di-, tri-, or tetra-halides, are incorporated with a support structure, principally based upon magnesium or zinc halides, ethoxides or the like. For example, U.S. Pat. No. 4,476,289 to Mayr et al. discloses so called "activated" titanium tetrahalides, more specifically, titanium tetrachloride, supported on anhydrous magnesium or zinc halides, principally magnesium chloride or magnesium bromide. The transition metal component is used in conjunction with a second component, commonly referred to as a co-catalyst, which as described in the Mayr et al. patent, is a hydride or organometallic compound based primarily upon aluminum, although lithium or magnesium based compounds are also disclosed. A supported catalyst containing yet another component is disclosed in U.S. Pat. No. 4,636,486 to Mayr et al. Here, the titanium compound, which may be a halide, an oxyhalide or an alcoholate in either the di-, tri-, or tetravalent form, is composited with the magnesium support, together with an electron donor compound. Such electron donors, commonly referred to as internal electron donors because they are incorporated as part of the transition metal catalyst component, can be selected from a broad class of compounds including amines, amides, phosphines, ethers, thioethers, alcohol esters, aldehydes, and ketones. As in the case of the aforementioned U.S. Pat. No. 4,476,289 to Mayr, the catalyst system here also includes an organoaluminum co-catalyst such as triethylaluminum, commonly referred to as TEAL. Both of the Mayr et al. patents teach that the molar ratio of the organoaluminum compound and the titanium catalyst component is not critical. In the polymerization of ethylene, such ratio is said to preferably be between 50 and 1,000.

Yet a third component often employed in Ziegler-type catalyst systems is a so-called external electron donor. The external electron donors function similarly as the internal electron donors and in a complimentary or supplementary manner to regulate monomer insertion into the polymer chain growing on the transition metal active sites. Thus, the electron donors can have an impact upon catalyst activity, polymer molecular weight, and polymer morphology as reflected in stereospecificity and physical parameters such as melting point. For example, in the polymerization of propylene, the addition of electron donors under controlled conditions can result in dramatic increases in activity (the amount of polymer produced per unit of catalyst) and in stereoregularity, e.g., an increase in isotactic polymer with a corresponding decrease in atactic. The most widely used external electron donors are organosilicon compounds such as organosilanes and organosiloxanes, including silyl ethers and esters such as alkyl or arylalkyl alkoxysilanes.

The complimentary nature of the internal and external electron donors is addressed in Soga, K. et al., "Effect of Diesters and Organosilicon Compounds on the Stability and Stereospecificity of Ziegler-Natta Catalysts", *Transition Metal Catalyzed Polymerizations: Ziegler-Natta and Metathesis Polymerizations*, Quirk, R. P., Ed., Cambridge University Press, New York, 1988, pp. 266–279. As discussed in Soga, the concentrations of the internal and external donors in the catalyst system can be adjusted in order to optimize the activity and the stereospecifity of the catalyst. In the experimental work reported there, the transition metal catalyst component comprising titanium tetrachloride supported on magnesium dichloride with an internal donor, e.g., di-N butylphthalate, was slurried in hexane followed by the addition of an external electron donor and triethylaluminum (TEAL) co-catalyst. Soga et al. report on polymerization rates over periods of several hours and isotactic indices measured over periods of several hours for various internal donor, external donor catalyst systems using several kinds of organosilicon compounds at varying concentrations expressed in terms of silicon/titanium mole ratios and TEAL/titanium mole ratios. Corresponding tests in the absence of electron donors were also carried out. Among the various external electron donors used in the Soga et al. experimental work, diphenyldimethoxysilane appeared to have the most efficiency in terms of improving activity and/or stereospecificity of the catalyst system, followed by phenyltriethoxysilane, followed in turn by phenyltrimethoxysilane and then by various tetraalkoxysilanes which were generally less efficient, although still effective. In various tests carried out with and without an external donor, phenyltriethoxysilane, the effect on rate time profiles for the polymerization of propylene varied depending upon the presence and nature of an internal donor. In absence of the external donor, the most active system was one employing ethyl benzoate as the internal donor followed by systems having no internal donor or di-n-butylphthalate or diphthalate grouped fairly closely together with the least active system employing dimethylphenol as the internal donor. Where the external donor was present, di-n-butylphthalate and then ethyl benzoate were the most effective internal donors followed in turn by the supported catalyst which was free of an internal donor and then systems employing diethylphthalate and dimethylphenol as internal donors. The aluminum/titanium mole ratios employed in Soga ranged from about 50 to 200; the silicon/titanium mole ratios range from about 10 to 50. Soga et al. proposed a mechanism to explain the experimental work involving several types of active sites available for production of isotactic polypropylene. The internal donor is hypothesized to coordinate with some of the active sites and to inhibit the formation of specific active sites which are not deactivated by the external donor.

U.S. Pat. No. 4,287,328 to Kikuta et al., is directed to the polymerization of alpha olefins in the presence of multi-component catalyst systems involving a "solid product" combined with an organoaluminum compound including, for example, $C_1$–$C_{10}$ trialkylaluminum, triethylaluminum, alkyl alkyoxyaluminums, and alkylaluminum halides, and an electron donor including various organic acids, alcohols, ethers, aldehydes, ketones, amines, alkenol amines, esters, phosphines, phosphites, thioethers, thioalcohols, silanes, and siloxanes. The "solid product" catalyst component is formed by reacting a trivalent metal halide such as aluminum trichloride, aluminum tribromide or ferric trichloride with a divalent metal compound such as magnesium, calcium, or zinc hydroxide or oxide or carbonate with titanium tetrachloride, characterized as an electron acceptor. Numerous orders of additions of the various components are described in Kikuta et al., especially in columns 6 through 9. Conditions of mixing can vary over wide temperature ranges and time intervals, but temperatures are preferably in the range of room temperature to about 100° C. The mixing of the various components can be carried out over periods of several minutes to several hours.

U.S. Pat. No. 4,567,155 to Tovrog et al., discloses multi-component catalyst systems useful in the gas phase polymerization of alpha olefins. In Tovrog et al., the catalyst systems comprise two base catalyst components, each containing subcomponents. The first component, identified as component "A" comprises a titanium component supported on a hydrocarbon insoluble magnesium component in combination with an electron compound. The second major component is a co-catalyst component, characterized as component "B" comprising a trialkylaluminum, an aromatic acid ester and an unhindered secondary amine. Tovrog discloses that the catalyst components may be mechanically activated by comminution prior to use in polymerization. Comminuted catalysts may be pre-polymerized with an alpha olefin before use as a polymerization catalyst component. In the pre-polymerization procedure, comminuted catalysts and an organoaluminum compound co-catalyst are contacted with an alpha olefin under polymerization conditions and preferably in the presence of a modifier such as methyl-p-toluate and an inert hydrocarbon such as hexane, with typical time durations for pre-polymerization and other pretreatment procedures involving periods of minutes up to a few hours.

U.S. Pat. No. 4,767,735 to Ewen et al. discloses a pre-polymerization process carried out over a period of less than a minute and usually ten seconds or less. In the Ewen et al. procedure, an organic solvent stream such as hexane or heptane is established in a pre-mixing line. To this stream are added sequentially a co-catalyst (TEAL), an external electron donor, diphenyldimethyoxysilane (DPMS) and a supported catalyst component (titanium tetrachloride supported on magnesium dichloride) to form a catalyst system which is then pre-polymerized by contact with propylene for a few seconds. An alternative mode of addition in the Ewen et al. procedure is to add the electron donor to the carrier stream after the addition of the titanium catalyst component, but still before the addition of the propylene. Ewen et al. disclose that the co-catalyst should be present when the electron donor and the transition metal catalyst component contact one another in order to avoid poisoning of the titanium catalyst. In the experimental work described in Ewen et al., one of two titanium chloride catalysts were used in conjunction with TEAL and DPMS under unspecified catalyst concentrations, but at relative amounts of TEAL and DPMS ranging from 2 mmol of TEAL and 0.4 mmol of DPMS (Al/Si ratio of 5) to 2 mmol of TEAL and 0.03 mmol of DPMS (Al/Si ratio of about 67).

High efficiency catalyst systems employing external electron donors which may be characterised generally as sec or tert alkyl or cycloalkyl, alkyl dialkoxy silanes in combination with titanium tetrachloride supported on magnesium based supports derived from dialkoxy magnesium compounds are disclosed in U.S. Pat. No. 4,927,797 to Ewen. By way of example, the supported catalyst may be formulated through the reaction of diethoxy magnesium, titanium tetrachloride, and n-butyl phthalate under appropriate conditions as specified in the patent. A suitable external electron donor here is methylcyclohexyl dimethoxysilane, which is compared with diphenyldimethoxysilane as disclosed in the aforementioned U.S. Pat. No. 4,767,735 to Ewen et al. Examples of internal donors disclosed in U.S. Pat. No. 4,927,797 include amines, amides, esters, ethers, aromatic esters, ketones, nitrites, phosphines, stibines, arsines, phosphoramides, thioethers, thioesters, aldehydes, alcoholates, and salts of organic acids. Specific internal donors used in formulating the catalyst component by contacting a titanium halide with a dialkoxymagnesium support material include dimethylphthalate, diethylphthalate, diisopropylphthalate, dipropylphthalate, dibutylphthalate, diamylphthalate, methylbutylphthalate, and various other phthalate acid esters.

SUMMARY OF THE INVENTION

In accordance with the present invention there are provided novel Ziegler-type catalyst systems and processes for the polymerization of olefins with such systems in which the internal electron donor levels are employed to arrive at a desired polymerization characteristic in the polymerization process. The catalyst systems utilized in carrying out the present invention involve transition metal catalyst components incorporating internal electron donors, an external electron donor component and a co-catalyst component which are mixed together to formulate the desired Ziegler-type catalyst systems which are charged to an olefin polymerization reactor. The transition metal catalyst component incorporates an internal electron donor in an amount to provide an internal electron donor/transition metal mole ratio for the catalyst system which corresponds to a desired polymerization characteristic such as yield of the polyolefin product, molecular weight characteristics such as polydispersity or crystallinity such as measured by the xylenes soluble content of a crystalline polymer such as isotactic polypropylene. The catalyst component is mixed with a co-catalyst component such as an alkyl aluminum, specifically, trimethylaluminum or triethylaluminum, the latter being preferred, and an external electron donor component, specifically, an organosilicon such as an organodialkoxysilane, preferably cyclohexymethyldimethoxysilane (CMDS). The catalyst system thus formulated is introduced into a polymerization reactor to effect polymerization of the olefin with the catalyst system. Specific olefins used in the polymerization process are $C_2$–$C_4$ alpha olefins. The preferred olefin is propylene in the production of stereoregular polypropylene. Preferred transition metal catalyst components are halides of titanium, zirconium or hafnium or vanadium, more specifically, a titanium tetrahalide such as titanium tetrachloride supported on a magnesium or zinc-based support.

A specific catalyst system embodying the invention, comprises a transition metal component having an internal electron donor in an amount providing an internal donor/transition metal mole ratio of no more than 2/3, an organoaluminum co-catalyst component in an amount to provide an aluminum/transition metal mole ratio of at least 100, and an organosilicon electron donor component in an amount to provide an aluminum/silicon mole ratio of no more than 200. Preferably the aluminum transition metal mole ratio is at least 200 and the aluminum/silicon mole ratio is 100 or less. In a process embodying the invention, a catalyst system as thus characterized is supplied to a polymerization reactor to effect polymerization of the olefin with the catalyst system. Thereafter, there is provided a second composite catalyst system meeting the aforementioned criteria of internal electron donor/transition metal ratio, aluminum/transition metal mole ratio, and aluminum/silicon mole ratio, but having a different ratio of internal electron donor to transition metal than the first system. The second system is introduced into the polymerization reactor to effect polymerization of the olefin to achieve a different polymerization characteristic than the first catalyst system.

DETAILED DESCRIPTION OF THE INVENTION

In the polymerization of unsaturated hydrocarbons over Ziegler-type catalysts, a desideratum common to all such processes, is a high yield of polymer, commonly expressed in terms of catalyst activity. Catalyst activity is normally given in terms of grams of polymer per gram of transition metal per hour.

A second important characteristic in polymer production is the bulk density of the polymer. The bulk density, commonly expressed in terms of grams per cubic centimeter, should be relatively high. If the bulk density is too low, the polymer will tend to be "fluffy" and will tend to cause plugging and handling problems in the product transfer system. This is particularly important in continuous or a semi-continuous polymerizations where plugging of the withdrawal outlet or another point in the polymerization system can cause serious interruptions in production schedules.

Yet another important polymer characteristic which is particularly significant in the case of alpha olefins containing three or more carbon atoms is the crystallinity of the polymer product. By way of example, in the polymerization of propylene, the resulting polymer product can be isotactic, syndiotactic or atactic. Syndiotactic and isotactic polymers are crystalline and are insoluble in hydrocarbons solvents such as xylene, as described below. Atactic polymers, on the other hand, are amorphous, waxy-type materials which exhibit high solubility in xylene. Finally, polydispersity of the polymer product can be an important consideration in the production of polypropylene and other polyolefins. Polydispersity, D, is a measure of molecular weight distribution. A broad molecular weight distribution as indicated by a relatively high polydispersity (D=Mw/Mn), is desirable for most applications.

In regard to polymer crystallinity and as described, for example, in U.S. Pat. No. 4,892,851 to Ewen et al., isotactic and syndiotactic polymers have regular repeatable structures which can be characterized in terms of the Fischer projection formula as described below. In the isotactic structure, all of the methyl groups attached to the tertiary carbon atom of the successive monomer units lie on the same side of a hypothetical plane extending through the main chain of the polymer as indicated schematically by the following two-dimensional representation.

(1)

For syndiotactic structures, the methyl groups attached to the tertiary carbon atoms on successive monomer units lie on alternative sides of the hypothetical plain is as follows:

(2)

For structure (1) above, the isotactic arrangement may be described employing Bovey's NMR nomenclature as—mmmm—in which each m represents a "meso" dyad of two successive methyl groups on the same side of the plane. Using this same nomenclature, the syndiotactic structure (2) above, may be described as—rrrr—, with each r indicating a "racemic" dyad of two successive methyl groups on opposite sides of the hypothetical plane. Of course, similar characterizations may be made for other polymers such as polystyrene or polyvinyl chloride. The non-crystalline atactic polymers involve randomly irregular structures. For a further description of other characterizations of atactic, isotactic and syndiotactic polymers, reference may be had to the aforementioned U.S. Pat. Nos. 4,794,096 and 4,892,851, the entire disclosures of which are incorporated herein by reference.

From the foregoing description, it will be recognized that the crystallinity of a polymer such as polypropylene can be characterized in terms of the percentage of the polymer which is soluble in xylene. For highly crystalline isotactic or syndiotactic polypropylene, with few atactic imperfections, the percent of the polymer soluble in xylene will be quite low, typically on the order of 4% or less and sometimes, below 3%. As the polymer chain becomes more atactic, xylene solubles can range to figures well in excess of 5%, indicating polymers which, while still retaining good structural integrity, have a high degree of atactic imperfections.

In the practice of the present invention one or more of the aforementioned characteristics can be affected through the use of appropriate internal electron donor levels. Batches of transition metal catalysts from any suitable source can be analyzed to determine for each batch of catalyst, the ratio of the internal donor to the transition metal. The appropriate catalyst can be used with the other catalyst components, the organosilicon electron donor and the organoaluminum co-catalyst, to arrive at a system having the desired ratio of internal electron donor to transition metal. The invention can be carried out by sequentially supplying transition metal components of different internal electron donor levels to the polymerization reactor in order to sequentially vary a desired polymerization characteristic from one batch of polymer to the next.

The present invention may be carried out employing individual catalyst components which are, in themselves, well known to those skilled in the art. As described previously, there are a wide variety of transition metal catalysts known to be useful in olefin polymerization and such known transition metal catalysts may be employed in the present invention. As a practical matter, it is known in the art to be desirable to use a supported catalyst component and while supported catalyst components which do not require an internal electron donor are known, see for example, the aforementioned U.S. Pat. No. 4,476,289 to Mayr et al., the present invention involves the use of supported transition metal catalyst components which incorporate an internal electron donor as described in the aforementioned U.S. Pat. No. 4,636,486 to Mayr et al. The Ziegler-type transition metal catalysts include, as is well known in the art, salts of transition metals found in Groups 4, 5 and 6 (New Notation) of the Periodic Table of Elements.

A preferred catalyst which can be used in the present invention is a new generation, Ziegler-type titanium catalyst as disclosed, for example, in the aforementioned U.S. Pat. No. 4,927,797 to Ewen. This catalyst comprises a solid catalyst component obtained by (i) suspending a dialkoxy magnesium in an aromatic hydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii), as disclosed in U.S. Pat. No. 4,927,797; and also in U.S. Patent Nos. 4,816,433 and 4,839,321, the entire disclosures of which are hereby incorporated.

Preferred aromatic hydrocarbons useful in the formation of the catalyst include benzene, xylene, ethylbenzene, propylbenzene and trimethylbenzene. A diester of phthalic acids is preferably used as the diester of the aromatic dicarboxylic acid. Examples include dimethyl phthalate, diethyl phthalate, dipropyl phthalate, diisopropyl phthalate, dibutyl phthalate, diisobutyl phthalate, diamyl phthalate, diisoamyl phthalate, methylbuty phthalate, ethylbutyl phthalate, ethylisobutyl phthalate and ethylpropyl phthalate. Suitable titanium halides include $TiCl_4$, $TiBr_4$ and $TiI_4$, with $TiCl_4$ being preferred.

The ratios of the respective components are not critical but can vary to tailor the performance of the catalyst. However, in general, the diester of the aromatic dicarboxylic acid is used in an amount of 0.01 to 2 g, preferably 0.1 to 1 g, per gram of the dialkoxy magnesium, and the titanium halide is used in an amount of at least 0.1 g, preferably at least 1 gram, per gram of the alkoxy magnesium. The amount of the aromatic hydrocarbon which is liquid at normal temperature should be sufficient to form a suspension.

Suspension of the dialkoxy magnesium into the aromatic hydrocarbon is performed at a temperature of from room temperature to the boiling point of the aromatic hydrocarbon used for up to 100 hours, preferably up to 10 hours. It is important that the formed suspension should not be a homogeneous solution. The contact of the suspension with the titanium halide and the contact of the composition obtained by said contact with the titanium halide are carried out at a temperature of from $-20°$ C. to the boiling point of the titanium halide used, preferably 50 to $120°$ C., for 10 minutes to 10 hours. The means for contacting the components is not particularly critical, so far as sufficient contact is attained among the respective components. Preferably, the contact is carried out by using a vessel provided with a stirrer.

Like the transition metal components, the co-catalyst components employed in the present invention can also be selected from materials which are old and well known in the art. The co-catalyst components used in the present invention are organoaluminum compounds which can include trialkylaluminum, dialkyl aluminum hydrides and halides, and mono alkyl aluminum compounds such as alkyl aluminum dihalides. Aluminum mono-, di-, or tri-alkoxides or phenoxides and the like may also be employed in the present invention. Suitable organoaluminum compounds useful as co-catalysts in Ziegler-Natta catalyst formulations are disclosed in the aforementioned patents to Mineshima et al. and Tovrog et al., as well as in U.S. Pat. No. 3,642,746 to Kashiwa et al. As a practical matter, the co-catalyst will usually take the form of an aluminum alkyl or aluminum alkyl halide, which, in some cases, may be complexed with another metal alkyl such as a lithium alkyl. Probably the most widely used co-catalysts are trimethylaluminum (TMA) and triethylaluminum (TEAL) with the latter normally being preferred as a co-catalyst in the polymerization of $C_3+$ alpha olefins such as in the production of polypropylene, propylene co-polymers, polyvinylchloride, and the like. For a general discussion of transition metal and organoaluminum co-catalyst components in Ziegler catalysis, reference is made to Boor, John "Ziegler-Natta Catalysts in Polymerizations", Academic Press, Inc., New York (1979) and particularly, Chapter 4 entitled "Chemical Description of Ziegler-Natta Catalysts for Olefms".

The final component incorporated into the catalyst system in accordance with the present invention is an external electron donor. Lewis bases which function in the nature of external electron donors are well known, as described previously. The external electron donor used in the present invention can be characterized as an organosilicon such as an organic siloxane or silane. Particularly suitable examples include methylcyclohexyl dimethoxysilane, isobutyl trimethoxysilane and diphenyl dimethoxysilane. Other suitable catalyst components which can be used in carrying out the invention are disclosed in the aforementioned paper by Soga et al. and U.S. Pat. No. 4,287,328 to Kikuta et al., U.S. Pat. No. 4,567,155 to Tovrog et al., U.S. Pat. No. 4,316,966 to Mineshima et al., and U.S. Pat. No. 4,927,797 to Ewen, the entire disclosures of which are incorporated herein by reference.

Specific applications of the present invention involve the formulation of Ziegler-type catalysts by mixing the various components including the transition metal component under certain orders of additions and contact times between components when going from one contacting step to another. After the several components are mixed together, the resulting multi-component catalyst is then contacted with the unsaturated monomer, preferably an alpha olefin, to effect polymerization of the monomer in the presence of the Ziegler-type catalyst. Preferably, the initial olefin contacting step subsequent to formulation of the composite catalyst is a pre-polymerization step with the resulting pre-polymerized catalyst then being supplied to a polymerization reactor to produce the desired polymer product.

Applicant's related application Ser. No. 07/846,930 filed Mar. 4, 1992 (now abandoned), discloses different orders of addition of the several catalyst components which can be used in formulating the catalyst systems with the relative amounts of catalyst components varying depending upon the particular order of addition. In most cases, the preferred order of addition will involve initial mixing of the transition metal catalyst component with the organoaluminum co-catalyst component. As disclosed in the aforementioned application Ser. No. 07/846,930 these components are employed together to formulate a precursor mixture having an aluminum to transition metal mole ratio which preferably is 200 or more. The resulting precursor mixture is then combined with the organosilicon external electron donor component to produce the Ziegler-type catalyst system in which the transition metal catalyst component and the electron donor component are present in relative amounts to provide an aluminum/silicon mole ranging up to 100. Application Ser. No. 07/846,930 discloses a preferred mole ratio of aluminum to silicon in the catalyst formulation of 50 or less. The mole ratio of silicon to transition metal is at least 5 and more preferably, within the range of 10–20. Relatively short time sequences are employed in formulating the catalyst system. More specifically, the precursor formulation of the organoaluminum co-catalyst and transition metal catalyst components is maintained for a time within the range of 5–120 seconds prior to subsequent contact with the organo-silicon electron donor component. This is then followed by maintaining this formulation with the added electron donor component in contact for a period ranging up to 110 seconds prior to contact of the formulation with the olefin.

Another approach to the formulation of a Ziegler-type catalyst system involves initial contact of the organoaluminum co-catalyst component with the external electron donor component. Here, these two components are used in relative amounts to provide a precursor mixture having an aluminum to silicon mole ratio of at least 10. This precursor formulation is then combined with the transition metal catalyst component in amounts to provide an aluminum/transition metal mole ratio which preferably is at least 200. The initial mixture of the organoaluminum and organosilicon compounds is maintained for a time of 5–120 seconds, more specifically, a time of 10–60 seconds prior to addition of the transition metal component. The resulting three component mixture is then maintained in contact for a period of up to 110 seconds, and preferably no more than 40 seconds prior to contact with an olefin in the subsequent polymerization step.

A third order of addition involves first mixing the organosilicon external electron donor and the transition metal catalyst component to form a precursor mixture having a mole ratio of silicon to transition metal of at least 5 for a short contact time up to 40 seconds and preferably no more than 30 seconds. This mixture is then combined with the organoaluminum co-catalyst component to provide a Ziegler-type formulation having an aluminum/silicon ratio of no more than 40. The second contact time prior to contact of the Ziegler-type catalyst mixture with an olefin is such as to provide a total of the first and second contact times of no more than 60 seconds.

The polymerization process may be carried out as either a batch-type, continuous, or semi-continuous process, but preferably, polymerization of the olefin monomer (or monomers) will be carried out in a loop-type reactor of the type disclosed in the aforementioned U.S. Pat. No. 4,767,735 to Ewen et al. As described in the Ewen et al. patent, when the catalyst components are formulated together, they are supplied to a linear tubular pre-polymerization reactor where they are contacted for a relatively short time with the pre-polymerization monomer prior to being introduced into the main loop-type reactor. By way of example, the residence time of the catalyst and monomer within the pre-polymerization reactor will be normally less than a minute, and usually within the range of a few seconds to perhaps 20 seconds, 10 seconds or less being preferred. In the experimental work described hereinafter, the catalyst components, after being combined to form the Ziegler-type catalysts, were pre-polymerized for a period of five seconds. Durations of this nature will be suitable in many commercial applications.

In practice, the most significant application of the present invention will be in the polymerization of $C_3+$ alpha olefins and particularly those polymerizations involving propylene, either alone or with another olefin, for example ethylene, to produce polypropylene or co-polymers such as ethylene/propylene co-polymer. The preferred transition metal components will be in the form of the titanium, zirconium or hafnium halides with supported tetravalent components such as titanium tetrachloride, being used in most commercial applications. Supports will normally take the form of a magnesium or zinc dihalide, dialkyl or dialkoxide such as magnesium dichloride or magnesium diethoxide, which may include magnesium alkoxide halides such as magnesium ethoxychloride. It will usually be preferred that the support be a magnesium compound. The co-catalyst in such applications will normally take the form of a trialkyl aluminum such as TEAL or TMA as described previously, and the electron donor, a siloxane or silane, and more specifically, cyclohexylmethyldimethoxysilane as described previously.

As disclosed in parent U.S. Pat. No. 5,432,139 the orders of addition and the contact times for the various orders of addition can be tailored to arrive at the desired characteristics of the final polymer product and to influence catalyst yields, for example, as measured by the catalyst efficiency in mass of polymer per mass of catalyst per unit of time. In addition, the aluminum/transition metal, aluminum/silicon and silicon/transition metal ratios can be varied to impact catalyst yields and polymer properties such as molecular weight distribution and xylene solubles. The results of varying these ratios for different orders of addition and modes of operations are indicated by the results of the experimental work set forth in application Ser. No. 07/846,930 (now abandoned) and U.S. Pat. No. 5,432,139 and as shown there, orders of addition, component ratios, and contact times can be interrelated in terms of polymer product and process characteristics. However, in general, it has been found that the order of addition in which the transition metal catalyst component and the organoaluminum component are mixed together first (a first contact time within the range of 5 to 120 seconds) followed by contact with the external electron donor (for a second contact time of about 110 seconds or less, and preferably a duration which is shorter than the first contact time), generally produces the best overall results in terms of polymer yield, polymer bulk density, and crystallinity as measured by a low xylene solubles content.

The second most favorable order of addition of the catalyst components involves initially mixing the external electron donor and the co-catalyst followed by contacting the resulting mixture with the transition metal catalyst component. Here, the bulk density is somewhat lower and the xylene solubles of the polymer product somewhat higher than in the case of the first order of addition. However, the polymer yield for this secondary order of addition can be forced somewhat higher than for the first order of addition and thus, this order of addition can be employed where the yield is of paramount concern. Here, the contact times are generally 5–120 seconds for the first mixture and up to 110 for the second prior to contact with the olefin.

The third order of addition involves first mixing the transition metal catalyst component and the external electron donor and then contacting this mixture with the co-catalyst. This produces results which, in general, are not as good as those achieved by the first two orders of additions. However, where xylene solubles are of paramount concern, an extremely low xylene soluble content can be achieved by using very short contact times in conjunction with this order of addition.

As reflected by the experimental work reported herein, the internal electron donor level, as measured by the internal donor/transition metal mole ratio, can be varied in order to bias polymer characteristics, as noted previously, in a desired direction and also in order to enhance the polymer yield for given co-catalyst levels, as measured by the aluminum/transition metal mole ratio, and for given external electron donor levels, as measured by the aluminum/silicon mole ratio. In the experimental work, four different catalysts were employed, each lot comprising a supported titanium tetrachloride catalyst which varied only in titanium content and internal electron donor content. The ratio of internal donor to transition metal (titanium) varied from 0.5 to 1 for the four catalysts. The catalyst incorporated n-dibutyl phthalate as an internal electron donor and the titanium tetrachloride was formulated on a magnesium-based support. The four catalysts identified herein as Catalysts A, B, C and D, are characterized below in Table I.

TABLE I

| Catalyst | % Ti | internal donor mmoles/gram-cat. | internal donor/ Ti ratio (mole/mole) |
|---|---|---|---|
| A | 2.85 | 0.30 | 0.50 |
| B | 2.41 | 0.33 | 0.65 |
| C | 2.83 | 0.54 | 0.91 |
| D | 2.52 | 0.52 | 1.00 |

The external donor used in the experimental work was cyclohexyl methyldimethoxysilane (CMDS) and the co-catalyst was triethyl aluminum (TEAL). Thus, the relatives amounts of co-catalyst and transition metal catalyst can be expressed in terms of the Al/Ti ratio, and the relative amounts of co-catalyst and external electron donor can be expressed in terms of the Al/Si ratio. For a further description of catalyst systems of the type employed in the experimental work, reference is made to the aforementioned U.S. Pat. No. 4,927,797 to Ewen.

The experiments were carried out using 10 milligrams of transition metal catalyst in each polymerization run. The amounts of co-catalyst and external electron donors were varied depending upon the desired Al/Ti and Al/Si ratios. In this experimental work, an Al/Ti ratio of 200 and an Al/Si ratio of 50 corresponded to 1.0 millimole of TEAL and 0.05 millimole of CMDS.

Each polymerization run was carried out for a period of one hour at 70° C. In carrying out the experimental runs, about 16 millimoles of hydrogen was added under a pressure differential of about 120 psig from a 48.7 milliliter hydrogen bomb to an empty 2 liter Zipperclave reactor. The dry reactor was initially under 1 to 2 psig of nitrogen. After supplying hydrogen to the reactor, one liter of propylene was added and the reactor was heated to the desired temperature of 70° C. and stirred at approximately 1,000 rpm.

The catalyst was then pre-contacted and charged into the reactor using the component addition technique involving four series-connected chambers as described in application Ser. No. 846,689, filed Mar. 4, 1992 by the inventors herein. The catalyst was pre-polymerized for a five-second pre-polymerization period. The experimental runs used the preferred order of addition described previously in which the transition metal catalyst and the co-catalyst were initially contacted followed by contact with the external electron donor. The time of contact between the catalyst and Teal was 20 seconds and the time of contact between the Teal catalyst mixture and electron donor was 50 seconds using the preferred mode of operation as described in application Ser. No. 846,540. Following the pre-contact period, the multi-chamber assembly was filled with liquid propylene for the five-second room temperature pre-polymerization period and the catalyst was then charged into the reactor with 600 milliliters of propylene. The total propylene in the polymerization reaction was about 1.45 liter, it being noted that some of the propylene was retained in the pre-contact assembly.

The results of the experimental work using the four catalyst systems of varying levels of internal electron donors are set forth in Tables II through V for Catalysts A, B, C, and D, respectively. In each of these tables, the first three columns set forth the mole ratios of aluminum/titanium, aluminum/silicon, and silicon/titanium, respectively. The fourth column sets forth the yield of polymer produced in grams and thus, gives an indication of catalyst activity for the various parameters depicted in the first three columns. The next three columns characterize the polymer product in terms of bulk density, percent xylene solubles, and melt flow index, and the last column gives the polydispersity of the polymer product obtained in each test.

TABLE II

| Catalyst A | | | | | | | |
|---|---|---|---|---|---|---|---|
| Al/Ti | Al/Si | Si/Ti | yield gms. | b.d. | % XS | MFI | D(Mw/Mn) |
| 100 | 20 | 5 | 145 | 0.42 | 3.60 | 3.29 | 7.823 |
| 200 | 20 | 10 | 256 | 0.47 | 2.44 | 2.41 | 7.019 |
| 500 | 20 | 25 | 274 | 0.47 | 2.40 | 2.44 | 7.519 |
| 1000 | 20 | 50 | 307 | 0.46 | 2.12 | 3.31 | 6.745 |
| 1500 | 20 | 75 | 278 | 0.47 | 1.92 | 3.01 | 6.257 |
| 200 | 50 | 4 | 278 | 0.45 | 4.92 | 3.68 | 7.537 |
| 200 | 100 | 2 | 288 | 0.38 | 11.43 | 9.96 | 8.003 |

TABLE III

Catalyst B

| Al/Ti | Al/Si | Si/Ti | yield gms. | b.d. | % XS | MFI | D(Mw/Mn) |
|---|---|---|---|---|---|---|---|
| 100 | 20 | 5 | 168 | 1.48 | 2.72 | 2.68 | 8.225 |
| 200 | 20 | 10 | 217 | 0.48 | 2.12 | 2.36 | 8.283 |
| 500 | 20 | 25 | 244 | 0.48 | 1.68 | 2.63 | 7.971 |
| 1000 | 20 | 50 | 283 | 0.47 | 1.60 | 2.84 | 7.065 |
| 1500 | 20 | 75 | 245 | 0.47 | 1.88 | 3.04 | 5.972 |
| 200 | 50 | 4 | 205 | 0.45 | 7.35 | 3.92 | 7.558 |
| 200 | 100 | 2 | 249 | 0.40 | 11.31 | 9.54 | 7.708 |

TABLE IV

Catalyst C

| Al/Ti | Al/Si | Si/Ti | yield gms. | b.d. | % XS | MFI | D(Mw/Mn) |
|---|---|---|---|---|---|---|---|
| 100 | 20 | 5 | 110 | 0.42 | 4.39 | 3.58 | 8.501 |
| 200 | 20 | 10 | 158 | 0.45 | 2.68 | 2.06 | 7.144 |
| 500 | 20 | 25 | 226 | 0.46 | 2.16 | 2.89 | 6.641 |
| 1000 | 20 | 50 | 256 | 0.45 | 2.44 | 3.42 | 6.140 |
| 1500 | 20 | 75 | 244 | 0.45 | 1.92 | 3.80 | 7.031 |
| 200 | 50 | 4 | 233 | 0.43 | 6.92 | 6.40 | 6.905 |
| 200 | 100 | 2 | 232 | 0.39 | 12.26 | 10.57 | 7.492 |

TABLE V

Catalyst D

| Al/Ti | Al/Si | Si/Ti | yield gms. | b.d. | % XS | MFI | D(Mw/Mn) |
|---|---|---|---|---|---|---|---|
| 100 | 20 | 5 | 150 | 0.46 | 2.16 | 3.06 | 8.135 |
| 200 | 20 | 10 | 183 | 0.46 | 2.04 | 3.16 | 7.389 |
| 500 | 20 | 25 | 207 | 0.46 | 2.32 | 3.40 | 6.278 |
| 1000 | 20 | 50 | 209 | 0.46 | 1.90 | 4.23 | 6.788 |
| 1500 | 20 | 75 | 245 | 0.46 | 1.84 | 3.94 | 6.395 |
| 200 | 50 | 4 | 181 | 0.46 | 7.72 | 7.27 | 7.029 |
| 200 | 100 | 2 | 182 | 0.39 | 11.27 | 14.02 | 7.834 |

Turning now to the drawings, certain of the experimental data presented in Tables II–V are represented graphically in FIGS. 1–6. In each of FIGS. 1–6, the curves are labeled A, B, C and D to correspond to the particular titanium tetrachloride catalyst used. It will be recalled that the internal donor/Ti ratio increases progressively when going from catalyst A to catalysts B, C and D.

Figure 1:
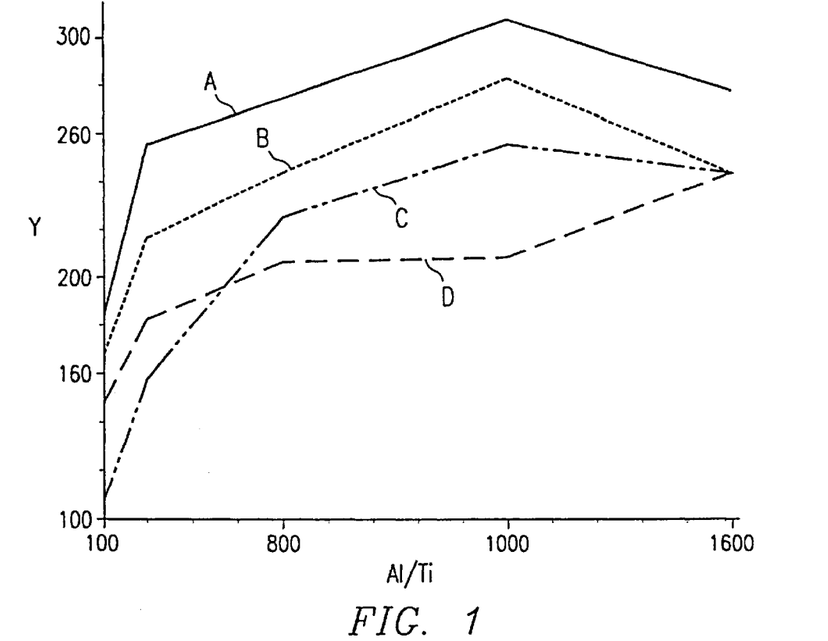
FIG. 1 is a graphical representation of polymer yield for catalyst components of different ratios of internal donor to transition metal as a function of aluminum/transition metal mole ratio.
Figure 2:
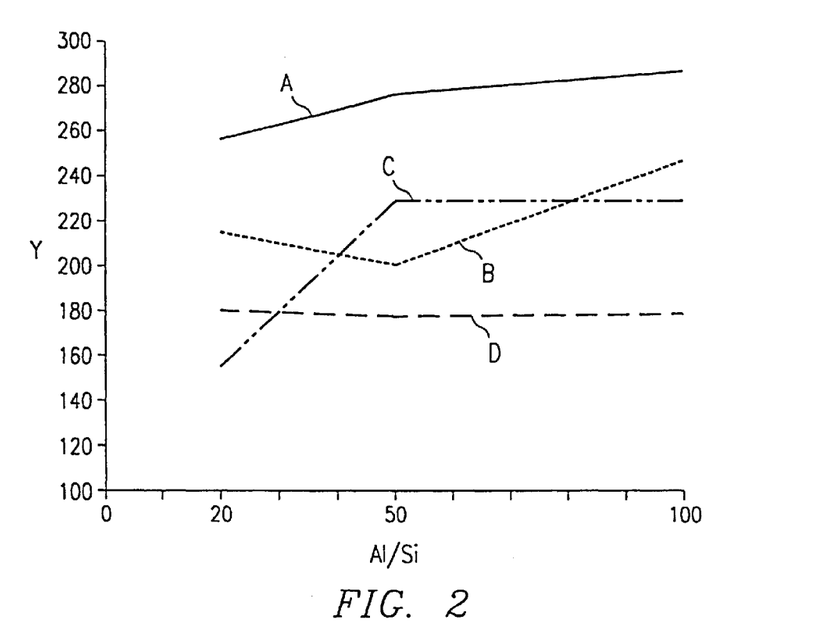
FIG. 2 is a graphical representation of yield as a function of aluminum/silicon mole ratio for catalyst components of different internal electron/donor transition mole ratios.
Figure 3:
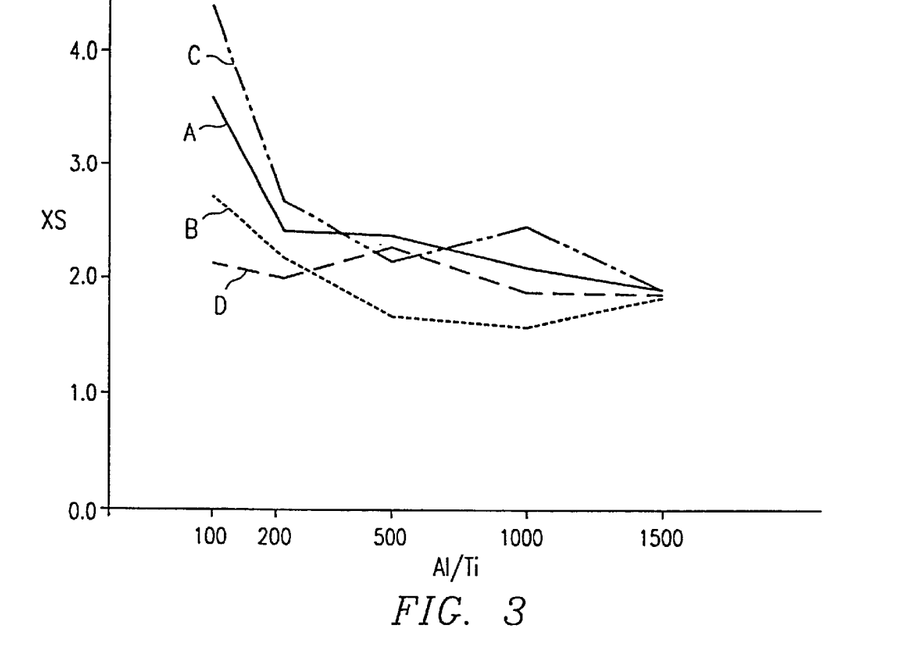
FIGS. 3, 4 and 5 are graphs of xylene soluble contents of polymer products as a function of aluminum/titanium mole ratio, aluminum/silicon mole ratio, and silicon/titanium mole ratio, respectively for catalyst systems of varying internal electron donor contents.
Figure 4:
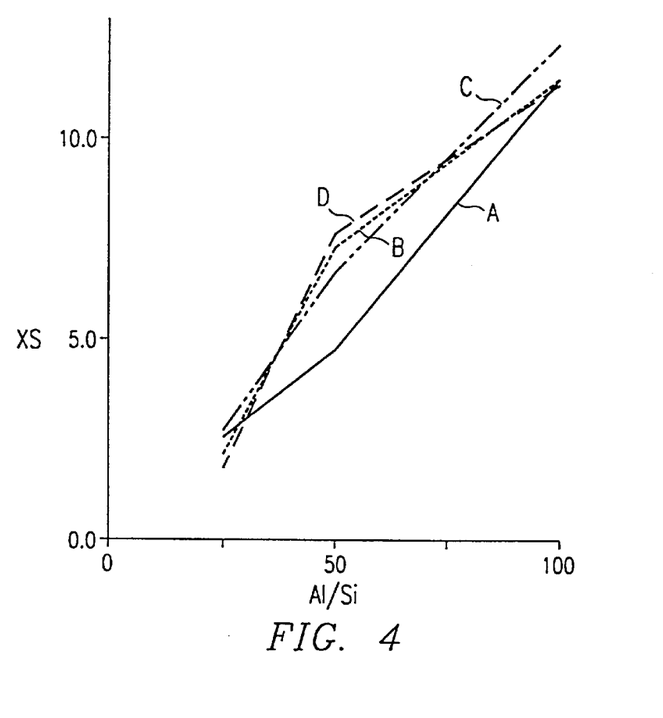
Figure 5:
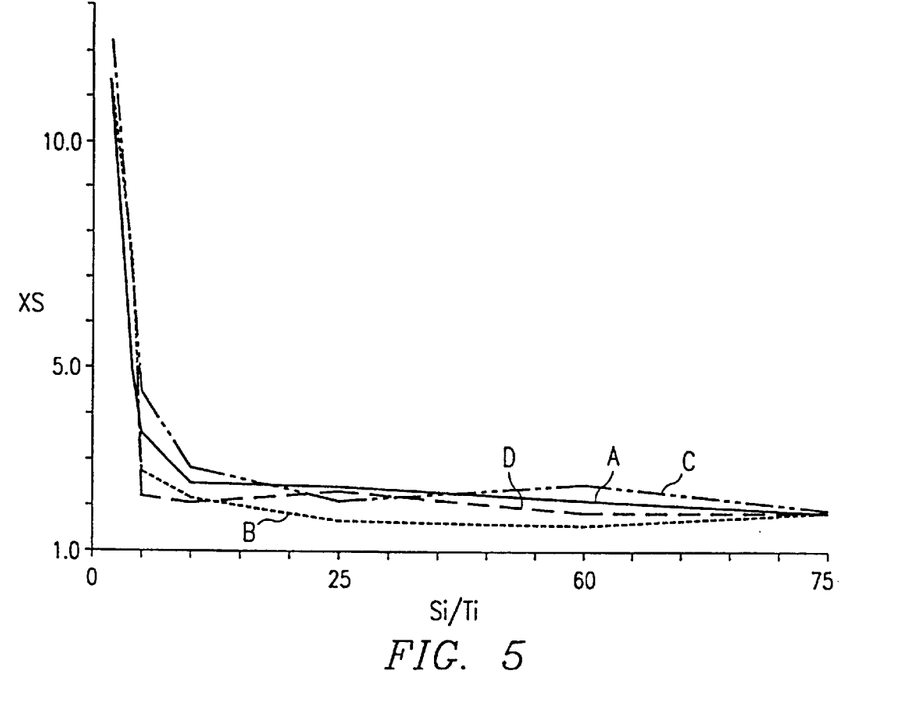
Figure 6:
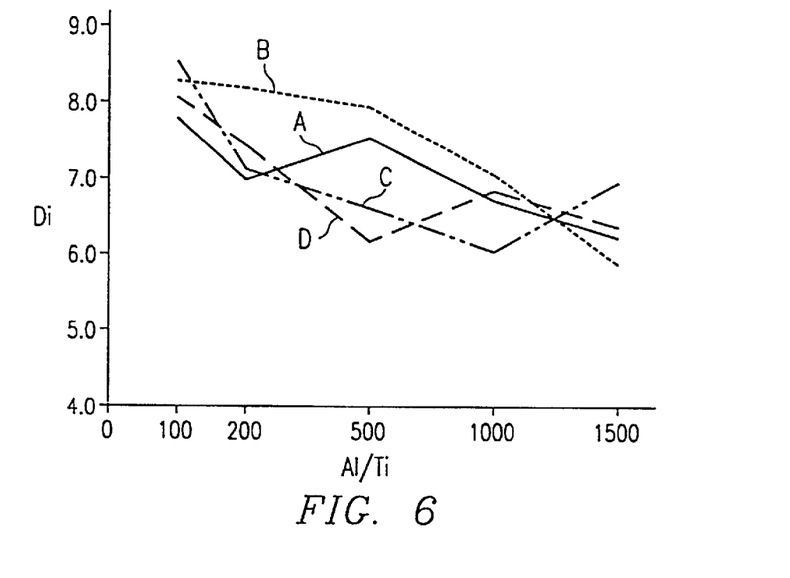
FIG. 6 is a graphical representation of polydispersity as a function of aluminum/titanium mole ratio for catalyst components of varying internal donor/transition metal mole ratio.

In the drawings, FIGS. 1 and 2 are graphs of the yield Y in grams plotted on the ordinate versus the aluminum/titanium mole ratio (Al/Ti) and aluminum|silicon mole ratio (Al/Si) respectively, plotted on the abscissa. FIG. 1 shows data with the Al/Si ratio held constant at 20 and FIG. 2 with the Al/Ti ratio held constant at 200. FIGS. 3 and 4 show weight percent xylene solubles (XS) on the abscissa plotted as a function of Al/Ti and Al/Si ratios plotted on the abscissas, respectively. FIG. 5 also shows the weight percent xylene solubles, in this case, plotted as a function of the Si/Ti mole ratio on the abscissa. FIG. 6 shows graphs representative of the polydispersity D plotted on the ordinate versus the Al/Ti mole ratio on the abscissa.

Considering first the data of FIG. 1, curves A through D show the effect of the aluminum/titanium ratio on yield with the Al/Si mole ratio held constant at 20. It can be seen that decreasing the internal donor/transition mole ratios to values less than 2/3 (curves A & B) increased the yield at an Al/Ti ratio of 100. For each of the catalysts A, B, C and D, yield increased sharply up to an Al/Ti ratio of 200 and then continued to increase, but at a lower rate as the concentration of Teal co-catalyst was increased up to the point where the Al/Ti ratio was 1,000. Where the internal donor/transition metal mole ratio is no more than 2/3 (Curves A and B), the yield progressively increases as the Al/Ti increases up to 1,000 where it reaches the maximum. Moreover, FIG. 1 shows that as a practical matter, an increase in yield can be achieved by decreasing the internal donor/transition metal mole ratio over a wide range of co-catalyst concentrations.

As shown in FIG. 2, with the Al/Ti ratio held constant at 200 (corresponding to the preferred minimum co-catalyst content), near maximum yields are achieved at an Al/Si ratio of about 20. For the catalyst having the lowest internal donor level, an increase in the Al/Si ratio to 50 supports a modest increase in yield, whereas for Catalyst B (having an internal donor/Ti ratio of 0.65) a modest decrease in yield is observed. Further enhancement in yield can be achieved by progressively increasing the Al/Si ratio so long as the internal donor/transition metal mole ratio is not allowed to exceed the desired maximum of 2/3. The Al/Si mole ratio should be kept to no more than 200 and preferably to no more than 100, since near maximum yields accrue at this level. Where the internal donor/transition metal mole ratio is at the low level of 0.5, an Al/Si ratio of 50 corresponds to a good yield. However, this must be considered in light of the loss in crystallinity as indicated by the higher xylene solubles content when exceeding an Al/Si ratio of 20 as discussed below.

FIG. 3 shows that with the Al/Si ratio held constant at 20, very low xylene solubles contents are achieved for all of the catalyst systems at an Al/Ti ratio of 200 and above. Somewhat higher, but still acceptable, xylene solubles are found at an Al/Ti ratio of 100. It appears that the internal donor level has only a modest impact upon xylene solubles so long as the Al/Ti ratio is maintained at 200 or more. While the lowest xylene solubles are achieved with catalyst systems A and B at an Al/Ti ratio of 1,000, the internal donor level has less impact here than at the lower Al/Ti ratios, and at the maximum Al/Ti ratio of 1,500, the xylene solubles content appears to be substantially the same for each of the four catalysts.

FIG. 4, in which the Al/Ti ratio is held constant at 200, shows that the xylene solubles content increases progressively and dramatically as the Al/Si ratio increases from 20 to 100. The data in FIG. 4 confirms that where the xylene solubles content is of paramount concern, the external donor should be present in a significant amount to keep the Al/Si ratio low. In this case, the Al/Si ratio preferably is 20 or less. FIG. 5 shows the relationship of the xylene solubles content with an increasing Si/Ti ratio resulting from variable Al/Ti and Al/Si ratios. As will be recognized from the foregoing, the Si/Ti ratio varies directly with the co-catalyst content and inversely with the external electron donor content as the Al/Ti and Al/Si ratios are varied. At Si/Ti ratios of 10 and above, minimum or near minimum xylene contents are achieved.

FIG. 6 shows the relationship between polydispersity and the co-catalyst content as measured by the Al/Ti mole ratio. The polydispersity, in general, shows a modest decrease with increasing Al/Ti ratio, but the decrease is by no means conspicuous. The data presented in FIG. 6 is obtained at a constant Al/Si ratio of 20. Where the Al/Ti ratio is held constant at the minimum preferred value of 200, an increase in the Al/Si ratio shows very little impact on polydispersity.

Having described specific embodiments of the present invention, it will be understood that modifications thereof may be suggested to those skilled in the art, and it is intended to cover all such modifications as fall within the scope of the appended claims.

What is claimed is:

1. In a method for the polymerization of an olefin with a Ziegler catalyst system, the method comprising;
   (a) providing a first composite Ziegler catalyst system comprising a transition metal catalyst component comprising a group 4, 5 or 6 transition metal and having an internal electron donor present in an amount to provide an internal donor/transition metal mole ratio of no more than 2/3, an organoaluminum co-catalyst component in an amount to provide an aluminum/transition metal mole ratio of at least 100 and an organosilicon electron donor component present in an amount to provide an aluminum/silicon mole ratio of no more than 200.
   (b) supplying said catalyst system to a polymerization reactor containing an olefin to effect polymerization of said olefin with said first catalyst system;
   (c) providing a second composite Ziegler catalyst system comprising a transition metal catalyst component comprising a group 4, 5 or 6 transition metal and having an internal electron donor present in an amount to provide an internal donor/transition metal mole ratio of no more than 2/3, but having a different internal electron donor/transition metal mole ratio than said first system, an organoaluminum co-catalyst component in an amount to provide an aluminum/transition metal mole ratio of at least 100 and an organosilicon electron donor component present in an amount to provide an aluminum/silicon mole ratio of no more than 200; and
   (d) and introducing said second catalyst system into said polymerization reactor to effect polymerization of said olefin with said second catalyst system to achieve a different polymerization characteristic than said first catalyst system.

2. The method of claim 1, wherein said olefin comprises a $C_2$–$C_4$ alpha olefin.

3. The method of claim 2, wherein said olefin comprises propylene.

4. The method of claim 3, wherein said transition metal catalyst component is a supported halide of titanium, zirconium, hafnium or vanadium.

5. The method of claim 4, wherein said transition metal component is a titanium tetrahalide supported on a magnesium or zinc based support.

6. The method of claim 5, wherein said internal electron donor is an organic ester.

7. The method of claim 6, wherein said co-catalyst is selected from the group consisting of trimethylaluminum and triethylaluminum.

8. The method of claim 7, wherein said external electron donor is an organodialkoxysilane.

9. The method of claim 8, wherein said external electron donor is cyclohexylmethyldimethoxysilane.

10. The method of claim 9, wherein said co-catalyst is triethylaluminum and said olefin comprises propylene.

11. The method of claim 10, wherein said different polymerization characteristic is the yield of polyolefin produced per unit amount of transition metal.

12. The method of claim 10, wherein said polymerization characteristic is the xylene solubles content of said polymer product.

13. The method of claim 10, wherein said polymerization characteristic is the polydispersity of said polyolefin produced in said polymerization reaction.

14. The method of claim 10, wherein said organic ester is a diester of phthalic acid selected from the group consisting of dimethyl phthalate, diethyl phthalate, dipropyl phthalate, diisopropyl phthalate, dibutyl phthalate, diisobutyl phthalate, diamyl phthalate, diisoamyl phthalate, methylbutyl phthalate, ethylbutyl phthalate, ethylisobutyl phthalate and ethylpropyl phthalate.

* * * * *

UNITED STATES PATENT AND TRADEMARK OFFICE
CERTIFICATE OF CORRECTION

PATENT NO.   : 6,489,411 B1
DATED        : December 5, 2002
INVENTOR(S)  : Edwar S. Shamshoum, David J. Rauscher and Shabbir A. Malbari It is certified that error appears in the above-identified patent and that said Letters Patent is hereby corrected as shown below:

Column 13,
Table III, replace the value "1.48" at the intersection of row1 and column b.d. with -- 0.48 --.

Signed and Sealed this

Fourth Day of May, 2004

JON W. DUDAS
*Acting Director of the United States Patent and Trademark Office*